United States Patent
Limpibunterng et al.

(10) Patent No.: US 8,688,327 B2
(45) Date of Patent: Apr. 1, 2014

(54) DRIVING SUPPORT APPARATUS OF VEHICLE

(75) Inventors: Theerawat Limpibunterng, Susono (JP); Takahiro Kojo, Gotenba (JP); Hirofumi Nitta, Ohbu (JP); Shoji Asai, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 90 days.

(21) Appl. No.: 13/387,589

(22) PCT Filed: Aug. 2, 2010

(86) PCT No.: PCT/JP2010/063042
§ 371 (c)(1),
(2), (4) Date: Jan. 27, 2012

(87) PCT Pub. No.: WO2011/016429
PCT Pub. Date: Feb. 10, 2011

(65) Prior Publication Data
US 2012/0123643 A1    May 17, 2012

(30) Foreign Application Priority Data
Aug. 3, 2009   (JP) ................................. 2009-180836

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |

(52) U.S. Cl.
USPC .................. 701/42; 701/36; 701/41; 180/404; 180/443

(58) Field of Classification Search
USPC ............. 701/1, 23, 24, 25, 36, 41, 42, 43, 44, 701/45, 48, 49; 180/400, 404, 412, 419, 180/421, 422, 443, 446, 168, 204; 340/439, 340/465, 426.31; 307/9.1
See application file for complete search history.

(56) References Cited

U.S. PATENT DOCUMENTS 5,765,116 A * 6/1998 Wilson-Jones et al. ......... 701/41
(Continued)

FOREIGN PATENT DOCUMENTS

| JP | A-09-301206 | 11/1997 |
|---|---|---|
| JP | A-11-078936 | 3/1999 |

(Continued)

OTHER PUBLICATIONS

International Search Report in International Application No. PCT/JP2010/062042; dated Nov. 16, 2010 (with English-language translation).

*Primary Examiner* — Rami Khatib
(74) *Attorney, Agent, or Firm* — Oliff PLC

(57) ABSTRACT

A driving support apparatus of a vehicle supports driving of the vehicle, the vehicle includes a rudder angle varying device capable of changing a relative relation between a steering angle and a rudder angle. The driving support apparatus includes a following control device for controlling the rudder angle varying device such that the vehicle follows a target driving route; a steering angle specifying device for specifying the steering angle; and a judging device for judging whether or not overriding performed by a driver takes place on the basis of the specified steering angle and a reference steering angle which is the steering angle in making the vehicle follow the target driving route. The following control device stops the vehicle following for the target driving route if it is judged that the overriding takes place.

2 Claims, 10 Drawing Sheets

(56) References Cited

U.S. PATENT DOCUMENTS

| | | | |
|---|---|---|---|
| 6,092,619 A | 7/2000 | Nishikawa et al. | |
| 6,212,452 B1 | 4/2001 | Shimizu et al. | |
| 6,324,452 B1 | 11/2001 | Ikegaya | |
| 7,613,556 B2 * | 11/2009 | Arima et al. | 701/41 |
| 7,765,066 B2 * | 7/2010 | Braeuchle et al. | 701/301 |
| 2005/0267661 A1 | 12/2005 | Iwazaki et al. | |
| 2010/0138112 A1 * | 6/2010 | Suzuki et al. | 701/42 |
| 2012/0179333 A1 * | 7/2012 | Thomys et al. | 701/41 |

FOREIGN PATENT DOCUMENTS

| | | |
|---|---|---|
| JP | A-11-286280 | 10/1999 |
| JP | A-2001-010519 | 1/2001 |
| JP | A-2002-046640 | 2/2002 |
| JP | A-2003-081115 | 3/2003 |
| JP | A-2004-256076 | 9/2004 |
| JP | A-2005-343184 | 12/2005 |
| JP | A-2007-160998 | 6/2007 |
| JP | A-2008-080866 | 4/2008 |
| WO | WO 2009017199 A1 * | 2/2009 |

* cited by examiner

DRIVING SUPPORT APPARATUS OF VEHICLE

TECHNICAL FIELD

The present invention relates to a driving support apparatus, such as LKA (Lane Keeping Assist), in a vehicle provided with various steering mechanisms, such as EPS (Electronic controlled Power Steering) or VGRS (Variable Gear Ratio Steering).

As this type of apparatus, there has been suggested an apparatus for enabling lane keeping driving by using a steering angle varying apparatus and an electrically-assisted power steering apparatus (e.g. refer to a patent document 1). According to the steering control apparatus of a vehicle disclosed in the patent document 1 (hereinafter referred to a "conventional technology"), the vehicle can be driven well along a target driving route by controlling the electrically-assisted power steering apparatus to obtain a target rudder angle based on a curvature radius at the time of lane keeping driving and by controlling the deviation of a yaw angle and the lateral position of the vehicle with respect to a driving route.

On the other hand, at the time of lane keeping driving, it is required in some cases that a driver urgently performs a steering operation, for avoiding an obstacle on the target driving route or for similar purposes. In order to respond to such a situation, with regard to the lane keeping control of the vehicle, overriding judgment is performed for judging the necessity of stopping the lane keeping driving on the basis of a parameter related to the driving state of the vehicle. As a technology associated with this type of overriding judgment, for example, a patent document 2 discloses a technology in which the overriding judgment is performed on the basis of a deviation between a target steering angle at the time of lane keeping driving and a steering angle of steering inputted by the driver. Moreover, a patent document 3 and a patent document 4 disclose a technology in which a criterion for the overriding judgment is set on the basis of a steering torque and a steering angle.

PRIOR ART DOCUMENT

Patent Document

Patent document 1: Japanese Patent Application Laid Open No. 2007-160998
Patent document 2: Japanese Patent Application Laid Open No. 2008-080866
Patent document 3: Japanese Patent Application Laid Open No. Hei 11-078936
Patent document 4: Japanese Patent Application Laid Open No. 2003-081115

DISCLOSURE OF INVENTION

Subject to be Solved by the Invention

Like the lane keeping control, when some driving force is directly or indirectly applied to steered wheels, thereby to change a rudder angle and follow the target route, a reaction force from a steering system including the steered wheels acts on a steering wheel, and in an extreme case, the steering wheel is counter-steered. Moreover, in the configuration that the rudder angle can be changed by applying to the steering system an assist torque for assisting the steering torque given by the driver, the steering wheel is operated independently of the driver's will, and thus the driver can highly likely feel uncomfortable. In other words, it is generally hard to realize the following for the target route by using a single steering mechanism, while suppressing the driver's uncomfortable feeling.

In the aforementioned patent document 1, a plurality of steering mechanisms are used, such as the electrically-assisted power steering apparatus and the steering angle varying apparatus. However, each of the mechanisms merely bears a part of control associated with the lane keeping. Thus, if it is tried to realize the target rudder angle based on the curvature radius by using the electrically-assisted power steering apparatus, it is hardly possible to avoid the growth of the uncomfortable feeling. Also in cases where it is tried to control the deviation of the yaw angle and the lateral position by using the steering angle varying apparatus, if the driver does not fix the steering wheel (i.e. if the driver does not firmly hold it), the steering wheel is turned due to a road surface reaction force and it is hardly possible to make the vehicle follow the target route.

In order to solve such problems, for example, in the vehicle in which the plurality of steering mechanisms are used, such as the electrically-assisted power steering apparatus and the steering angle varying apparatus, it is conceivable to make the electrically-assisted power steering apparatus and the steering angle varying apparatus cooperate with each other.

As one of such cooperative control, on one hand, it is conceivable to make a change in the rudder angle required for the lane keeping by using a rudder angle varying device while generating the steering torque by using the electrically-assisted power steering apparatus. On the other hand, it is conceivable to reduce the degree of the change in the rudder angle with respect to the steering input provided via the steering wheel during the lane keeping driving. In this case, the steering wheel is not significantly operated independently of the driver's will. Thus, it is possible to suppress the growth of the uncomfortable feeling. Moreover, since the sensitivity of the rudder angle is reduced with respect to the steering input from the steering wheel side, it is possible to suppress an excessive change in the behavior of the vehicle with respect to the steering input.

By the way, during the vehicle driving, for various reasons, the steering operation (overriding) based on the driver's will can occur, as occasion demands. From the view point that the lane keeping control should not be performed against the driver's will, the lane keeping control is to be ended quickly if the overriding takes place. Therefore, in this type of vehicle, inevitably, the overriding judgment needs to be performed, quickly and accurately.

Here, the aforementioned patent document 2 discloses a technical idea in which the overriding judgment is performed on the basis of the deviation between the target steering angle and the steering angle. However, the technical idea does not have such an assumption that the target steering angle itself can change in any manner, like for example the aforementioned cooperative control. If the target steering angle itself changes, then, timing for the overriding judgment inevitably goes off and the accurate overriding judgment becomes difficult.

Moreover, particularly if it is intended to stabilize the vehicle behavior toward the driver's steering operation by means of the aforementioned cooperative operation or the like, an influence of the driver's steering operation on the change in the rudder angle of the steered wheels is suppressed to be relatively small at the time of lane keeping driving (i.e. at the time of following). On the other hand, as disclosed in the patent document 3, if it is tried to perform the overriding judgment by using the steering torque, the amount of the steering operation necessary to obtain the reasonable steering torque tends to be excessively large. Thus, it is hard to quickly perform the overriding judgment, and it is also hard to avoid the occurrence of the commensurate uncomfortable feeling. Moreover, on the other hand, as disclosed in the patent document 4, if it is tried to perform the overriding judgment in accordance with the steering angle, the extent of the influence of the driver's steering operation on the vehicle behavior changes according to circumstances. Thus, it is hard to set a reference value for performing the overriding judgment.

As described above, in the conventional technology including the technologies disclosed in the aforementioned various patent documents, there is such a technical problem that the quick and accurate overriding judgment tends to be difficult if it is intended to suppress both the uncomfortable feeling given to the driver and the unstabilization of the vehicle behavior.

In view of the aforementioned problems, it is therefore an object of the present invention to provide a driving support apparatus of a vehicle, capable of detecting the overriding performed by the driver, quickly and accurately, when the vehicle is made follow the target driving route.

Means for Solving the Subject

The above object of the present invention can be achieved by a first driving support apparatus of a vehicle for supporting driving of the vehicle, the vehicle provided with a rudder angle varying device capable of changing a relative relation between a steering angle as a rotation angle of a steering input shaft and a rudder angle as a rotation angle of steered wheels, the driving support apparatus provided with: a following control device for controlling the rudder angle varying device such that the vehicle follows a target driving route; a steering angle specifying device for specifying the steering angle; and a judging device for judging whether or not overriding performed by a driver takes place on the basis of the specified steering angle and a reference steering angle which is the steering angle in making the vehicle follow the target driving route, the following control device stopping the vehicle following for the target driving route if it is judged that the overriding takes place.

The vehicle of the present invention is provided with the rudder angle varying device, and the rudder angle varying device can change the relative relation between the steering angle as the rotation angle of the steering input shaft and the rudder angle as the rotation angle of the steered wheels, gradually, continuously, or discretely. The change may be realized through physical, mechanical, electrical or magnetic various processes, and the rudder angle varying device of the present invention conceptually includes various apparatuses that can realize the change. In other words, according to the rudder angle varying device, the relation between the steering angle and the rudder angle is not uniquely defined, and for example, a ratio between the steering angle and the rudder angle (or so-called transmission ratio) can be changed. Alternatively, the rudder angle can be changed independently of the steering angle. The rudder angle varying device may be configured as a VGRS, SBW (Steer By Wire: electrical rudder angle varying device), or the like as a preferred form.

The first driving support apparatus of the vehicle of the present invention is an apparatus for controlling the vehicle equipped with the rudder angle varying device, and for example, it can adopt forms of various computer systems such as various controllers or microcomputer apparatuses, various processing units such as a single or a plurality of ECUs (Electronic Controlled Unit), which can appropriately include various memory devices such as a buffer memory or a flash memory, a RAM (Random Access Memory) or a ROM (Read Only Memory), various processors or various controllers, one or a plurality of MPUs (Micro Processing Unit), CPUs (Central Processing Unit), etc.

According to the driving support apparatus of the vehicle of the present invention, in its operation, the vehicle is made follow the target driving route via the control of the rudder angle varying apparatus, by the following control device. In other words, so-called lane keeping driving such as LKA is realized as a preferred form.

At this time, the following control device may determine the control target value of the rudder angle varying apparatus through for example known various algorithms and various control processes, and may control the rudder angle varying apparatus. More specifically, for example, the curvature of the target driving route, a position deviation and a yaw deviation between the vehicle and a white line or the like for defining the target driving route, and the like may be calculated or estimated on the basis of the image of the target driving route imaged by an in-vehicle camera or the like. On the basis of them, target lateral acceleration for making the vehicle follow the target driving route may be calculated or estimated. After that, on the basis of the calculated or estimated target lateral acceleration, the control target value may be set as a target rudder angle or the like which is the target value of the amount of change in the rudder angle to be realized.

On the other hand, in a period in which the vehicle is made follow the target driving route as described above, the so-called overriding can take place as occasion demands in which the driver operates a steering input device such as a steering wheel, with a clear will. This type of overriding may be accompanied by an emergent steering operation in order to avoid an obstacle on the target driving route or the like, or accompanied by a relatively mild steering operation in order to change lanes, look ahead, and the like. In any case, the judgment needs to be performed somehow. Moreover, considering that the driver's clear will is to be reflected, if the overriding takes place, its detection is desirably performed quickly and accurately. Thus, in the driving support apparatus of the vehicle of the present invention, the judgment of whether or not the overriding takes place (hereinafter referred to as "overriding judgment" as occasion demands) is performed in the following manner.

In other words, in the first driving support apparatus of the vehicle of the present invention, when the overriding judgment is performed, the steering angle is specified by the specifying device, and it is judged by the judging device whether or not the overriding takes place on the basis of the specified steering angle and the reference steering angle for providing a criterion for the steering angle. Incidentally, the wording "specify" in the present invention conceptually includes detect, calculate, derive, estimate, identify, select, obtain, and the like, and as long as it can be established as reference information in terms of control, its practical aspect is not limited in any manner. For example, the steering angle specifying device may specify the steering angle by obtaining information corresponding to the steering angle as an electrical signal from various detecting devices such as a steering angle sensor attached to the steering input shaft.

Here, the reference steering angle is the steering angle in making the vehicle follow the target driving route and the steering angle when there is no steering input performed by the driver in making the vehicle follow the target driving route. In other words, in the control that the steering wheel and the steered wheels are practically separated, such as for example so-called auto steering, the reference steering angle is zero. Alternatively, if the amount of change in the steering angle that can minimize the uncomfortable feeling given to the driver (plainly speaking, it is a visually uncomfortable feeling) with respect to a change in the behavior of the vehicle that occurs when the vehicle is made follow the target driving route is determined on the basis of experiments, experiences, theories, or simulations etc. in advance, then, the reference steering angle may be also such a steering angle that can be changed as occasion demands in accordance with the vehicle behavior at that time point and that can minimize the uncomfortable feeling given to the driver.

The reference steering angle is preferably always gauged on the basis of the control aspect of the following control device or the aforementioned relative relation, regardless of whether the input of the steering angle is necessary for the change in the rudder angle (in this case, the reference steering angle can be uniquely defined by the relative relation) or the input of the steering angle is unnecessary for the change in the rudder angle (in this case, the reference steering angle is zero), or in cases where they are combined (namely, in cases where a final change in the rudder angle is given by adding up the change in the rudder angle that depends on the steering angle and the change in the rudder angle that does not depend on the steering angle).

The practical aspect associated the judgment process of the judging device based on the specified steering angle and the reference steering angle can adopt various aspects and is not uniquely limited. For example, it may be judged that the overriding takes place when the specified steering angle becomes greater than the reference steering angle, or it may be judged that the overriding takes place when a deviation between the specified steering angle and the reference steering angle exceeds a certain or uncertain threshold value. Alternatively, simply, in addition to those mutual relations, the driving condition of the vehicle or the like may be added, as occasion demands.

Anyway, according to the driving support apparatus of the vehicle of the present invention, in judging whether or not the overriding performed by the driver takes place on the basis of the steering angle, the reference steering angle at that time point can be always used. Thus, it is possible to preferably prevent such failures that the change in the steering angle given through the rudder angle varying device in order to make the vehicle follow the target driving route is misjudged as the steering input performed by the driver and an erroneous decision indicative of the occurrence of the overriding is made, and that the overriding is not judged to take place unless a proper change in the steering angle is given, although the steered wheels are separated from the steering input shaft (i.e. the reference steering angle is zero) in the vehicle following for the target driving route. In other words, in making the vehicle follow the target driving route, it is possible to detect the overriding performed by the driver, quickly and accurately.

In addition, the first driving support apparatus of the vehicle of the present invention can uniform the judgment accuracy of the overriding, which cannot be achieved if the criterion is fixed, by means of a technical idea indicating that the criterion for the steering angle is always made variable in a form according to the following control for the target driving route performed at that time point, by focusing on that if it is intended to receive various benefits, such as suppressing the unstabilization of the vehicle behavior and the addition to the uncomfortable feeling to the driver, through the drive control of the rudder angle varying device and preferably a steering torque assisting device such as an EPS in making the vehicle follow the target drive, the steering angle can be also variable in a form limited by the control. In other words, according to the present invention, it is advantageous over any technical idea that the reference steering angle cannot be made significantly variable, in the point that in making the vehicle follow the target drive, no matter how the rudder angle varying device or moreover the steering torque assisting device or the like is controlled, the overriding judgment can be performed always with a certain accuracy.

Incidentally, the following control device ends the vehicle following for the target driving route if it is judged by the judging device that the overriding takes place. Thus, according to the driving support apparatus of the vehicle of the present invention, the vehicle does not display a behavior against the driver's will, and the vehicle behavior can be stabilized as much as possible.

Incidentally, the overriding judgment can be performed when the driver intends to control the vehicle by means of the steering via the steering wheel on the basis of a reason or event which is temporarily generated at the time of lane keeping driving. Thus, the lane keeping driving may be restarted as occasion demands on the basis of various judgment criteria which are objective and reasonable, such as after an elapse of a predetermined period.

In one aspect of the first driving support apparatus of the vehicle of the present invention, the judging device judges that the overriding takes place if a deviation between the steering angle and the reference steering angle is greater than or equal to a predetermined threshold value.

According to this aspect, the comparison with the threshold value can result in the relatively simple overriding judgment. Thus, it is practically useful.

Incidentally, in this aspect, it may be provided with a threshold value setting device for setting the threshold value in accordance with a driving condition of the vehicle.

Here, the driving condition conceptually includes a vehicle operating condition, an environmental condition, and the like, and it means for example the road shape of the target driving route, a vehicle speed, or the like. If the driving condition is different, the optimum value of the threshold value to be used for the overriding judgment can be also different. Thus, if the threshold value is made variable, the judgment accuracy of the overriding can be kept constant without an influence of the driving condition of the vehicle.

The above object of the present invention can be also achieved by a second driving support apparatus of a vehicle for supporting driving of the vehicle, the vehicle provided with a rudder angle varying device capable of changing a relative relation between a steering angle as a rotation angle of a steering input shaft and a rudder angle as a rotation angle of steered wheels, the driving support apparatus provided with: a following control device for controlling the rudder angle varying device such that the vehicle follows a target driving route; a steering torque specifying device for specifying a steering torque applied to the steering input shaft; and a judging device for judging whether or not overriding performed by a driver takes place on the basis of the specified steering torque and a predetermined threshold value, the following control device stopping the vehicle following for the target driving route if it is judged that the overriding takes place.

According to the second driving support apparatus of the vehicle of the present invention, in performing the overriding judgment, the steering torque is specified by the steering torque specifying device, and it is judged by the judging device whether or not the overriding takes place on the basis of the specified steering torque and the threshold value. In other words, as opposed to the aforementioned first driving support apparatus of the vehicle, the overriding judgment is performed by using the steering torque.

On the other hand, the steering torque given via the steering input shaft by the driver has such a characteristic that it changes depending on the rudder angle of the steering angle. If a slow rudder angle change characteristic with respect to the steering angle is given by the rudder angle varying device, an increase in the steering torque is also slow. Thus, if the threshold value is a fixed value, the amount of change in the steering angle, which is necessary to realize the change in the rudder angle corresponding to the threshold value, excessively increases depending on the control aspect of the rudder angle varying device in making the vehicle follow the target driving route, and overriding judgment timing is delayed, which is problematic.

Here, in the second driving support apparatus of the vehicle of the present invention, by virtue of the threshold value setting device, the threshold value is made variable in accordance with the relative relation between the steering angle and the rudder angle. Thus, according to the second driving support apparatus of the vehicle, it is possible to maintain the steering feeling on the driver's side when the overriding is detected, always at a certain level, by setting the threshold value to be relatively small if the change in the rudder angle with respect to the steering angle is relatively small, or by setting the threshold value to be relatively large if the change in the rudder angle with respect to the steering angle is relatively large, or by performing similar setting. In other words, in making the vehicle follow the target driving route, it is possible to detect the overriding performed by the driver, quickly and accurately.

In addition, the second driving support apparatus of the vehicle of the present invention can uniform the judgment accuracy of the overriding, which cannot be achieved if the threshold value is fixed, by means of a technical idea indicating that the threshold value of the steering torque is always made variable in a form according to the following control for the target driving route performed at that time point, by focusing on that if it is intended to receive various benefits, such as suppressing the unstabilization of the vehicle behavior and the addition to the uncomfortable feeling to the driver, through the drive control of the rudder angle varying device and preferably the steering torque assisting device such as an EPS in making the vehicle follow the target drive, the steering torque of the vehicle can be also variable in a form limited by the control. In other words, according to the present invention, it is advantageous over any technical idea that the threshold value of the steering torque cannot be made significantly variable, in the point that in making the vehicle follow the target drive, no matter how the rudder angle varying device or moreover the steering torque assisting device or the like is controlled, the overriding judgment can be performed always with a certain accuracy.

In another aspect of the first and second driving support apparatuses of the vehicle of the present invention, the rudder angle varying device changes the relative relation by relatively rotating a steering output shaft coupled with the steered wheels with respect to the steering input shaft, and the following control device controls the rudder angle varying device at the time of following for the target driving route such that a steering transmission ratio as the relative relation, which defines a rotation angle of the steering output shaft with respect to the steering angle, is reduced in comparison with at the time of non-following for the target driving route.

According to this aspect, since an influence of the driver's steering operation on the vehicle behavior can be reduced in comparison with at the time of non-following, it is possible to suppress a decrease in the robustness of the vehicle behavior at the time of lane keeping driving. Moreover, an influence of the driver's steering input on the change in the rudder angle is reduced by the rudder angle varying device. At the same time, if the change in the rudder angle required for the following for the target driving route is given independently of the steering input, the growth of the uncomfortable feeling that the steering wheel is operated excessively and independently of the driver's will in the following for the target driving route is also preferably suppressed. According to this aspect, in the first and second driving support apparatuses of the vehicle, by virtue of this type of control, the accurate overriding judgment can be performed when the following control accompanying the practically very useful effect on the target driving route is performed. Thus, it is extremely useful in practice.

The operation and other advantages of the present invention will become more apparent from the embodiments explained below.

BEST MODE FOR CARRYING OUT THE INVENTION

Hereinafter, various embodiments of the driving support apparatus of the vehicle in the present invention will be explained with reference to the drawings as occasion demands.

First Embodiment

Structure of Embodiment

Figure 1:
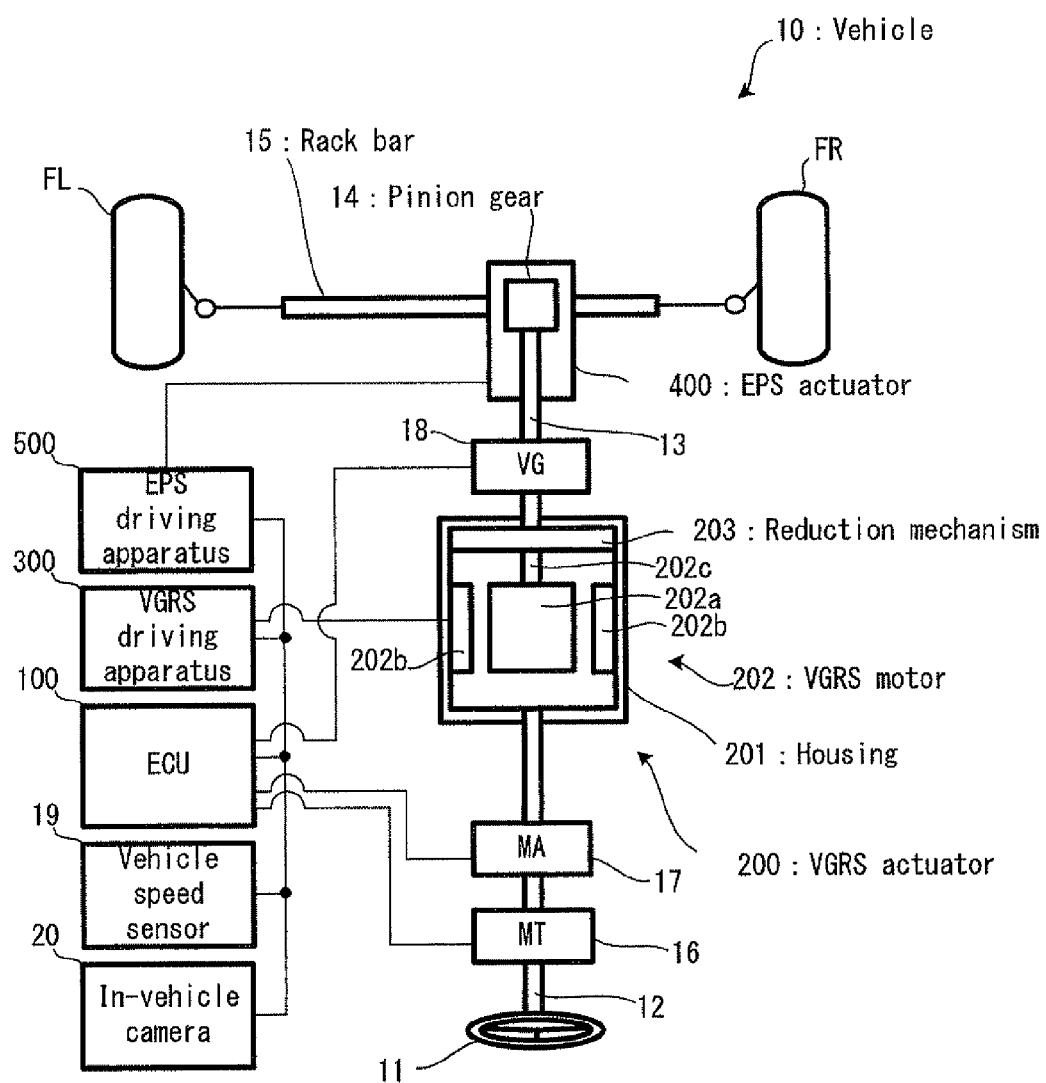
FIG. 1 is a schematic configuration diagram conceptually showing the structure of a vehicle in a first embodiment of the present invention.

Firstly, with reference to FIG. 1, the structure of a vehicle 10 in the embodiment will be explained. FIG. 1 is a schematic configuration diagram conceptually showing the structure of the vehicle 10.

In FIG. 1, the vehicle 10 is provided with a pair of front wheels FL and FR on either sides as steered wheels, and it is configured to move in a desired direction by steering the front wheels. The vehicle 10 is provided with an ECU 100, a VGRS actuator 200, a VGRS driving apparatus 300, an EPS actuator 400 and an EPS driving apparatus 500.

The ECU 100 is provided with a CPU (Central Processing Unit), a ROM (Read Only Memory) and a RAM (Random Access Memory), each of which is not illustrated, and it is an electronic control unit capable of controlling all the operations of the vehicle 10. The ECU 100 is one example of the "driving support apparatus of the vehicle" of the present invention. The ECU 100 is configured to perform each of LKA control, EPS control and VGRS control described later, in accordance with a control program stored in the ROM.

Incidentally, the ECU 100 is a unified or one-body electronic control unit, configured to function as one example of each of the "following control device", the "steering angle specifying device", the "judging device" and the "threshold value setting device" of the present invention. The operations of each of the devices are all performed by the ECU 100. However, the physical, mechanical and electrical configurations of each of the devices of the present invention are not limited to this, and each of the devices may be configured as various computer systems, such as a plurality of ECUs, various processing units, various controllers, or micro computer apparatuses.

In the vehicle 10, a steering input given by a driver via a steering wheel 11 is transmitted to an upper steering shaft 12, as a shaft which is coaxially rotatably coupled with the steering wheel 11 and which can rotate in the same direction as that of the steering wheel 11. The upper steering shaft 12 is one example of the "steering input shaft" of the present invention. The upper steering shaft 12 is coupled with the VGRS actuator 200 at the end on the downstream side.

The VGRS actuator 200 is one example of the "rudder angle varying device" of the present invention, which is provided with a housing 201, a VGRS motor 202, and a reduction gear mechanism 203.

The housing 201 is the case of the VGRS actuator 200 for accommodating the VGRS motor 202 and the reduction gear mechanism 203. The end on the downstream side of the upper steering shaft 12 described above is fixed to the housing 201, and the housing 201 can rotate with the upper steering shaft 12.

The VGRS motor 202 is a DC brushless motor having a rotor 202a as a rotator, a stator 202b as a stationary part, and a rotating shaft 202c as the output shaft of a driving force. The stator 202b is fixed to the inside of the housing 201, and the rotor 202a is rotatably held within the housing 201. The rotating shaft 202c is coaxially rotatably fixed to the rotor 202a, and its end on the downstream side is coupled with the reduction gear mechanism 203.

The reduction gear mechanism 203 is a planetary gear mechanism having a plurality of rotational elements which can perform differential rotation (a sun gear, a carrier, and a ring gear). Of the plurality of rotational elements, the sun gear as the first rotational element is coupled with the rotating shaft 202c of the VGRS motor 202, and the carrier as the second rotational element is coupled with the housing 201. Moreover, the ring gear as the third rotational element is coupled with a lower steering shaft 13.

According to the reduction gear mechanism 203 having such a structure, the rotational speed of the upper steering shaft 12 according to the operation amount of the steering wheel 11 (i.e. the rotational speed of the housing 201 coupled with the carrier) and the rotational speed of the VGRS motor 202 (i.e. the rotational speed of the rotating shaft 202c coupled with the sun gear) uniquely determine the rotational speed of the lower steering shaft 13 coupled with the ring gear as the remaining one rotational element. At this time, it is possible to perform increase/reduction control on the rotational speed of the lower steering shaft 13 by performing increase/reduction control on the rotational speed of the VGRS motor 202 by means of the differential action between the rotational elements. In other words, the upper steering shaft 12 and the lower steering shaft 13 can perform relative rotation by the action of the VGRS motor 202 and the reduction gear mechanism 203. Moreover, in terms of the structure of each rotational element in the reduction gear mechanism 203, the rotational speed of the VGRS motor 202 is transmitted to the lower steering shaft 13 in the state that it is reduced in accordance with a predetermined reduction ratio determined in accordance with a gear ratio between the rotational elements.

As described above, in the vehicle 10, since the upper steering shaft 12 and the lower steering shaft 13 can perform the relative rotation, a steering transmission ratio is continuously variable in a predetermined set range, wherein the steering transmission ratio is a ratio between a steering angle MA as the amount of rotation of the upper steering shaft 12 and a rudder angle θst of the front wheels as the steered wheels which is uniquely determined according to the amount of rotation of the lower steering shaft 13 (which is also related to the gear ratio of a rack and pinion mechanism described later).

Incidentally, the reduction gear mechanism 203 may have not only the planetary gear mechanism exemplified here but also another aspect (e.g. an aspect in which gears, each having the different number of teeth, are coupled with the upper steering shaft 12 and the lower steering shaft 13, in which a flexible gear in contact with each of the gears in one portion is set, and in which the flexible gear is rotated by a motor torque transmitted via a wave generator, thereby relatively rotating the upper steering shaft 12 and the lower steering shaft 13). Alternatively, the reduction gear mechanism 203 may have a physical, mechanical, or mechanistic aspect different from the aforementioned aspect even in the planetary gear mechanism.

The VGRS driving apparatus 300 is an electric drive circuit, including a PWM circuit, a transistor circuit, an inverter, and the like, capable of electrifying the stator 202b of the VGRS motor 202. The VGRS driving apparatus 300 is electrically connected to a not-illustrated battery, and it can supply a driving voltage to the VGRS motor 202 by using an electric power supplied from the battery. Moreover, the VGRS driving apparatus 300 is electrically connected to the ECU 100, and its operation is controlled by the ECU 100. Incidentally, the VGRS driving apparatus 300 and the VGRS actuator 202 constitute one example of the "rudder angle varying device" of the present invention.

The rotation of the lower steering shaft 13 is transmitted to a rack and pinion mechanism. The rack and pinion mechanism is a steering force transmission mechanism including: a pinion gear 14 connected to the downstream side edge of the lower steering shaft 13; and a rack bar 15 in which there are formed gear teeth which engage with the gear teeth of the pinion gear 14. By converting the rotation of the pinion gear 14 to the horizontal motion of the rack bar 15 in FIG. 1, a steering force is transmitted to each of the steered wheels via tie rods and knuckles (whose reference numerals are omitted) coupled with the both ends of the rack bar 15. In other words, in the vehicle 10, a so-called rack and pinion type steering method is realized.

The EPS actuator 400 is provided with an EPS motor as a DC brushless motor including a not-illustrated rotor as a rotator to which a permanent magnet is attached and a stator as a stationary part which surrounds the rotor. The EPS motor can generate an assist torque TA in the direction of rotation of the rotor, which is rotated by the action of a rotating magnetic field formed in the EPS motor due to the electrification to the stator via the EPS driving apparatus 500.

On the other hand, a not-illustrated reduction gear is fixed to a motor shaft as the rotation shaft of the EPS motor, and the reduction gear also engages with the pinion gear 14. Thus, the assist torque TA coming from the EPS motor functions as an assist torque for assisting the rotation of the pinion gear 14. The pinion gear 14 is coupled with the lower steering shaft 13 as described above, and the lower steering shaft 13 is coupled with the upper steering shaft 12 via the VGRS actuator 200. Therefore, a driver steering torque MT applied to the upper steering shaft 12 is transmitted to the rack bar 15 in the form that it is assisted by the assist torque TA, as occasion demands, by which the driver's steering load is reduced.

The EPS driving apparatus 500 is an electric drive circuit, including a PWM circuit, a transistor circuit, an inverter, and the like, capable of electrifying the stator of the EPS motor. The EPS driving apparatus 500 is electrically connected to a not-illustrated battery, and it can supply a driving voltage to the EPS motor by using an electric power supplied from the battery. Moreover, the EPS driving apparatus 500 is electrically connected to the ECU 100, and its operation is controlled by the ECU 100.

On the other hand, the vehicle 10 is provided with various sensors including a steering torque sensor 16, a steering angle sensor 17, and a rotation sensor 18.

The steering torque sensor 16 is a sensor capable of detecting the driver steering torque MT given via the steering wheel 11 by the driver. Explaining it more specifically, the upper steering shaft 12 has such a structure that it is divided into an upstream part and a downstream part and that the parts are mutually coupled by a not-illustrated torsion bar. To the both ends on the upstream side and the downstream side of the torsion bar, rings for detecting a rotational phase difference are fixed. The torsion bar is twisted in its rotational direction in accordance with a steering torque (i.e. driver steering torque MT) transmitted via the upstream part of the upper steering shaft 12 when the driver of the vehicle 10 operates the steering wheel 11, and the steering torque can be transmitted to the downstream part with the twist generated. Therefore, upon the transmission of the steering torque, there is the rotational phase difference between the rings for detecting the rotational phase difference described above. The steering torque sensor 16 can detect the rotational phase difference, convert the rotational phase difference to the steering torque, and output it as an electrical signal corresponding to the steering torque MT. Moreover, the steering torque sensor 16 is electrically connected to the ECU 100, and the detected steering torque MT is referred to by the ECU 100 with a constant or irregular period.

The steering angle sensor 17 is an angle sensor capable of detecting the steering angle MA which indicates the amount of rotation of the upper steering shaft 12. The steering angle sensor 17 is electrically connected to the ECU 100, and the detected steering angle MA is referred to by the ECU 100 with a constant or irregular period.

The rotation sensor 18 is a rotary encoder capable of detecting a rotational phase difference $\Delta\theta$ between the housing 201 in the VGRS actuator 200 (i.e. which is equivalent to the upper steering shaft 12 in terms of rotation angle) and the lower steering shaft 13. The rotation sensor 18 is electrically connected to the ECU 100, and the detected rotational phase difference $\Delta\theta$ is referred to by the ECU 100 with a constant or irregular period.

A vehicle speed sensor 19 is a sensor capable of detecting a vehicle speed V as the speed or velocity of the vehicle 10. The vehicle speed sensor 19 is electrically connected to the ECU 100, and the detected vehicle speed V is referred to by the ECU 100 with a constant or irregular period.

An in-vehicle camera 20 is an imaging apparatus which is disposed on the front nose of the vehicle 10 and which can image a predetermined area ahead of the vehicle 10. The in-vehicle camera 20 is electrically connected to the ECU 100, and the imaged area ahead is sent out to the ECU 100 as image data with a constant or irregular period. The ECU 100 can analyze the image data and obtain various data necessary for LKA control described later.

Operations in Embodiment

Hereinafter, with reference to the drawings as occasion demands, the operations in the embodiment will be explained.

Figure 2:
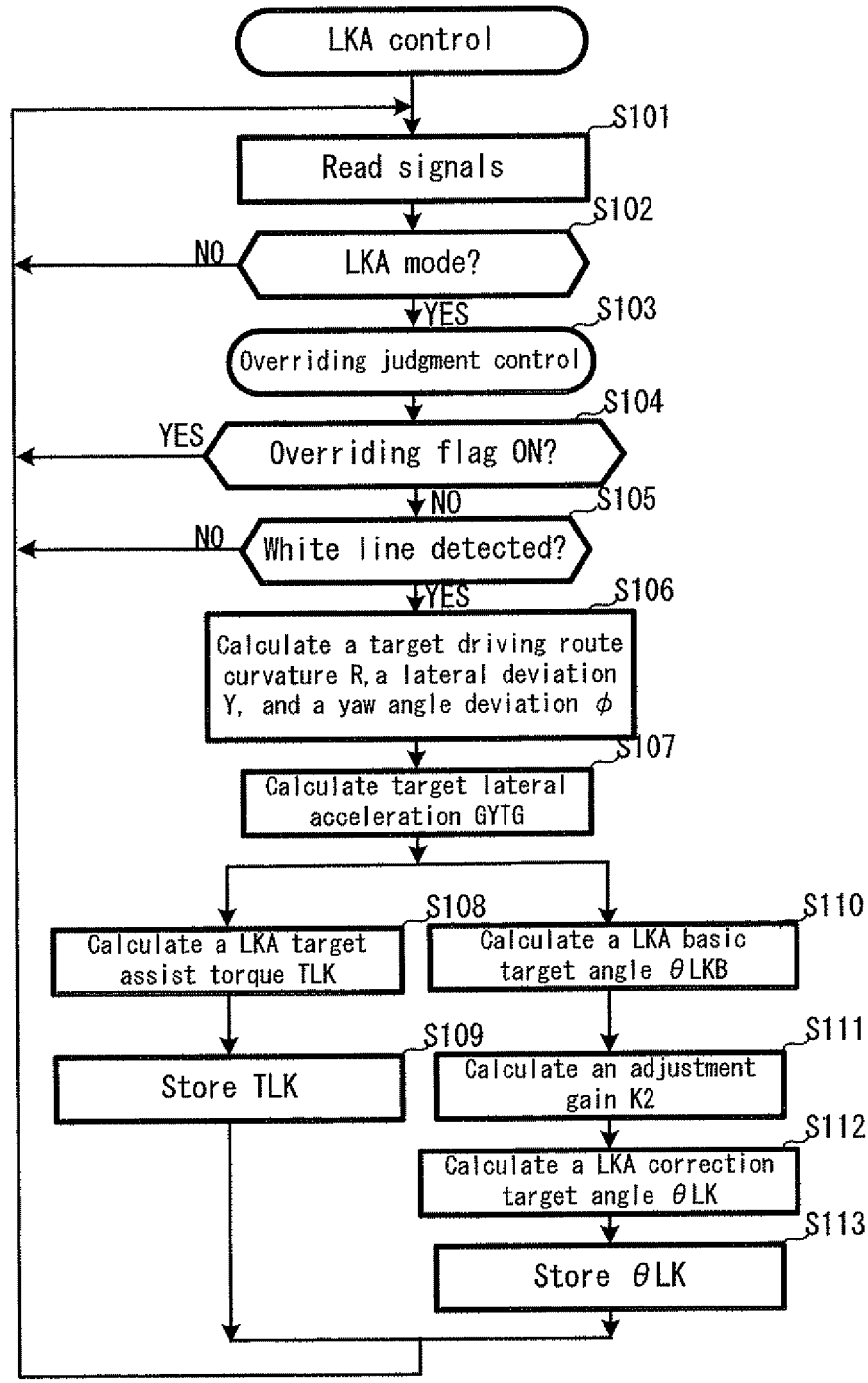
FIG. 2 is a flowchart showing LKA control performed in the vehicle in FIG. 1, in the first embodiment.

Firstly, with reference to 2, an explanation will be given on the details of the LKA control performed by the ECU 100. FIG. 2 is a flowchart showing the LKA control. Incidentally, the LKA control is control for making the vehicle 10 follow a target driving route (lane) and for realizing one portion of a driving support system owned by the vehicle 10.

In FIG. 2, the ECU 100 reads various signals including sensor signals associated with the aforementioned various sensors, various flags, and operation signals for operating various switches and the like provided for the vehicle 10 (step S101) and judges whether or not a LKA mode is selected as a result of the driver operating an operation button for initiating the LKA control disposed in the vehicle interior of the vehicle 10 in advance (step S102). If the LKA mode is not selected (the step S102: NO), the ECU 100 returns the process to the step S101.

If the LKA mode is selected (the step S102: YES), the ECU 100 performs overriding judgment by performing overriding judgment control (step S103). The result of the overriding judgment is stored as ON/OFF of an overriding flag in a predetermined memory area on the RAM as one portion of the ECU 100. The overriding flag is set to OFF in an initial state, and if the overriding judgment is performed, the ECU 100 sets the overriding flag to ON. Incidentally, the details of the overriding judgment control will be described in an explanation about the overriding judgment control described later.

After performing the overriding judgment control, the ECU 100 refers to the ON/OFF of the overriding flag (step S104). If the overriding flag is ON (the step S104: YES), the ECU 100 controls the vehicle 10 such that the LKA control is stopped during a predetermined period. After the elapse of the predetermined period (i.e. after the elapse of a period in which LKA control is stopped), the overriding flag is automatically rewritten by the CPU into the OFF state, and the ECU 100 returns the process to the step S101.

If the overriding flag is OFF (the step S104: NO), the steps explained below will be performed in order.

If the overriding flag is OFF (the step S104: NO), the ECU 100 judges whether or not a white line (which is not necessarily white) for defining the target driving route of the LKA is detected on the basis of the image data transmitted from the in-vehicle camera 20 (step S105). If the white line is not detected (the step S105: NO), the ECU 100 returns the process to the step S101 because the target driving route cannot be defined. On the other hand, if the white line is detected (the step S105: YES), the ECU 100 calculates various road surface information required when the vehicle 10 is made follow the target driving route (step S106).

In the step S106, a curvature R of the target driving route (i.e. inverse of a radius), a lateral deviation Y between the white line and the vehicle 10, and a yaw angle deviation φ between the white line and the vehicle 10 are calculated. Incidentally, various aspects including a known image recognition algorithm can be applied to an aspect of calculating information required for the control to follow the target driving route of this type and it has a weak correlation with the essential part of the present invention. Thus, the calculation aspect will not be mentioned herein.

If calculating the various road surface information, the ECU 100 calculates target lateral acceleration GYTG necessary to make the vehicle 10 follow the target driving route (step S107). Incidentally, the target lateral acceleration GYTG can be also calculated in accordance with various known algorithms or arithmetic expressions. Alternatively, the ECU 100 may calculate the target lateral acceleration GYTG by holding a target lateral acceleration map, which uses the curvature R, the lateral deviation Y and the yaw angle deviation φ described above as parameters, in a proper storing device such as a ROM in advance and by selecting an appropriate value as occasion demands (wherein this type of selection is also one aspect of the calculation).

If the target lateral acceleration GYTG is calculated, the process branches to two systems. In other words, in one process, the ECU 100 calculates a LKA target assist torque TLK (step S108) and stores the calculated LKA target assist torque TLK into a proper rewritable storing device, such as a flash memory and a RAM (step S109). The LKA target assist torque TLK is defined in a LKA target assist torque map, which uses the target lateral acceleration GYTG and the vehicle speed V as parameters and which is stored in a ROM in advance, and the ECU 100 calculates the LKA target assist torque TLK by selecting an appropriate numerical value from the map.

Moreover, in the other process, the ECU 100 calculates a LKA basic target angle θLKB on the basis of the target lateral acceleration GYTG (step S110), and then calculates an adjustment gain K2 on the basis of the curvature R (step S111). Moreover, the ECU 100 calculates a LKA correction target angle θLK in accordance with the following equation (1) (step S112). If calculating the LKA correction target angle θLK, the ECU 100 stores the calculated the LKA correction target angle θLK into the storing device such as a RAM and a flash memory (step S113).

$$\theta LK = \theta LKB \times K2 \quad (1)$$

Figure 3:
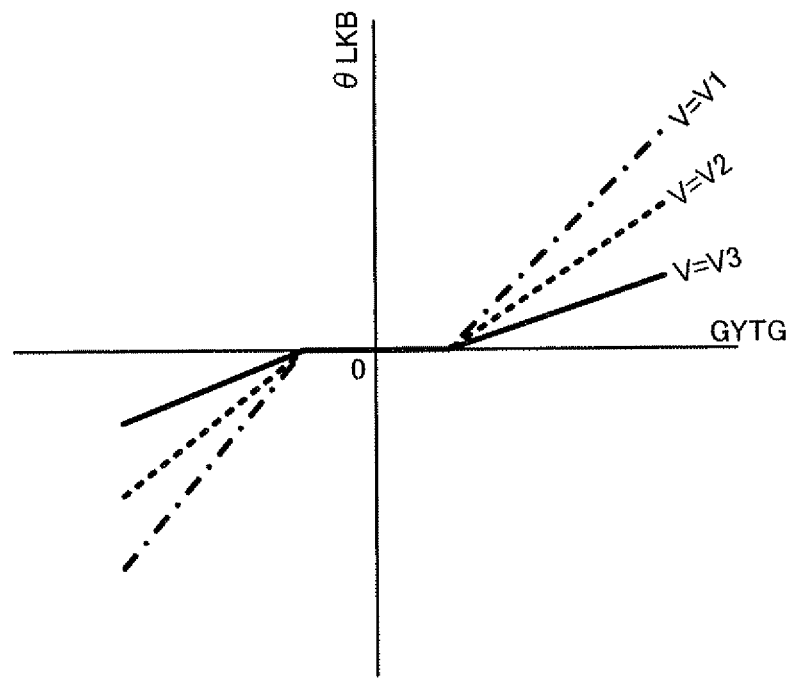
FIG. 3 is a schematic diagram showing a relation between target lateral acceleration GYTG and a LKA basic target angle θLKB in the vehicle in the first embodiment.

Now, with reference to FIG. 3, an explanation will be given on a relation between the target lateral acceleration GYTG and the LKA basic target angle θLKB. FIG. 3 is a schematic diagram showing the relation between the target lateral acceleration GYTG and the LKA basic target angle ηLKB.

In FIG. 3, the vertical axis shows the LKA basic target angle θLKB, and the horizontal axis shows the target lateral acceleration GYTG. Here, an area on the left side of an origin line corresponding to the target lateral acceleration GYTG=0 denotes target lateral acceleration corresponding to a vehicle left direction, and an area on the right side denotes lateral acceleration corresponding to a vehicle right direction. Moreover, an area on the upper side of an origin line corresponding to the LKA basic target angle θLKB=0 corresponds to a rudder angle in the vehicle right direction, and an area on the lower side corresponds to a rudder angle in the vehicle left direction. Therefore, the LKA basic target angle θLKB has a symmetrical characteristic to the origin line. The LKA basic target angle θLKB has such a characteristic that its absolute value linearly increases with respect to the target lateral acceleration GYTG, except for a dead-band region near the target lateral acceleration GYTG=0.

On the other hand, FIG. 3 illustrates the characteristics of the LKA basic target angle θLKB with respect to three types of vehicle speeds V which are the vehicle speed V=V1, V2 (V2>V1) and V3 (V3>V2) in an alternate long and short line, a dashed line, and a solid line, respectively. As is clear from FIG. 3, the LKA basic target angle θLKB is set on the reduction side with an increase in the vehicle speed. This is because the degree of the lateral acceleration generated with respect to the rudder angle increases with an increase in the vehicle speed.

Incidentally, the ROM of the ECU 100 stores therein a LKA basic target angle map which quantifies the relation shown in FIG. 3 in advance (of course, the vehicle speed V as a parameter value is finer), and an appropriate value is selected from the LKA basic target angle map in the step S110.

Figure 4:
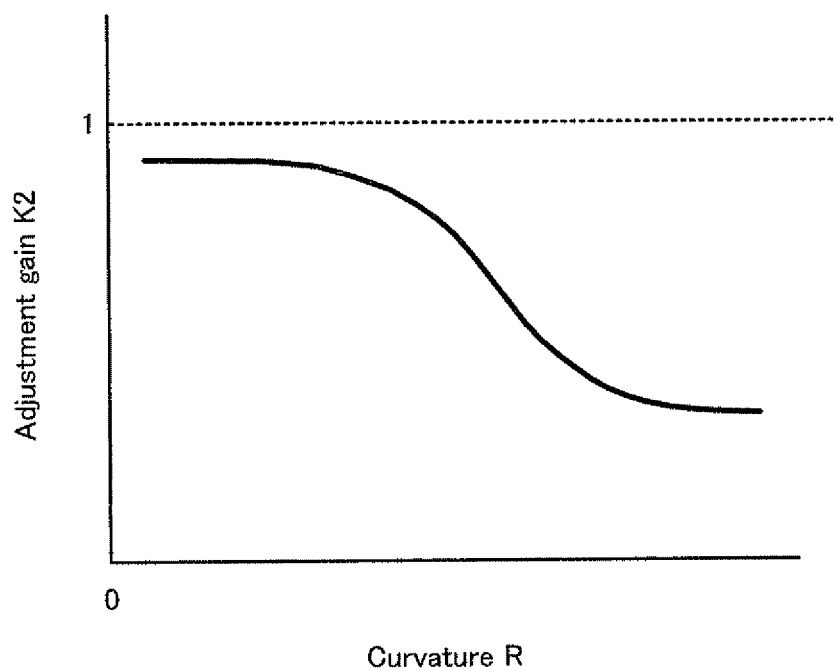
FIG. 4 is a schematic diagram showing a relation between a curvature R and an adjustment gain K2 in the vehicle in the first embodiment.

Now, with reference to FIG. 4, a relation between the curvature R and the adjustment gain K2 will be explained. FIG. 4 is a schematic diagram showing the relation between the curvature R and the adjustment gain K2.

In FIG. 4, the vertical axis shows the adjustment gain K2, and the horizontal axis shows the curvature R of the target driving route. Therefore, the target driving route is suddenly curved (i.e. sharp curve) with movement to the right side in FIG. 4. As shown in FIG. 4, the adjustment gain K2 is set in an area less than 1, and it is set to be smaller with an increase in the curvature R (i.e. with a shaper curve). This is because the steering of the steering wheel 11 is allowed (an uncomfortable feeling is not generated from the driver's viewpoint) with an increase in the curvature.

Incidentally, the ROM of the ECU 100 stores therein an adjustment gain map which quantifies the relation shown in FIG. 4 in advance, and an appropriate value is selected from the adjustment gain map in the step S111.

Back in FIG. 2, if the LKA target assist torque TLK and the LKA correction target angle θLK are calculated in the step S109 and the step S113, respectively, the process is returned to the step S101. The LKA control is performed as described above.

On the other hand, the actual operation of the vehicle 10 following the target driving route is realized by EPS control.

Figure 5:
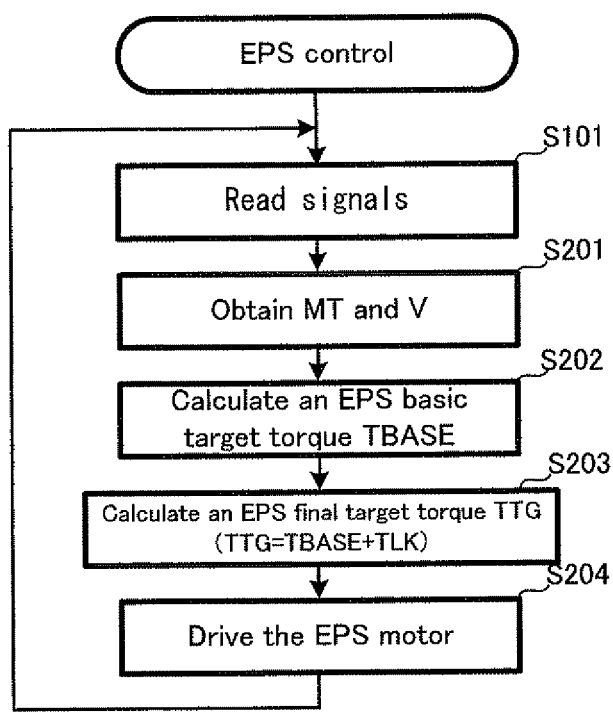
FIG. 5 is a flowchart showing EPS control in the vehicle in the first embodiment.

Now, with reference to FIG. 5, the details of the EPS control will be explained. FIG. 5 is a flowchart showing the EPS control. Incidentally, in FIG. 5, the overlap points with FIG. 2 will carry the same reference numerals, and the explanation thereof will be omitted as occasion demands.

In FIG. 5, the ECU 100 reads the various signals (the step S101) and then obtains the driver steering torque MT and the vehicle speed V (step S201). Then, the ECU 100 calculates an EPS basic target torque TBASE, which is the basic value of the assist torque TA to be outputted from the EPS motor of the EPS actuator 400, on the basis of the obtained driver steering torque MT and the obtained vehicle speed V (step S202).

Figure 6:
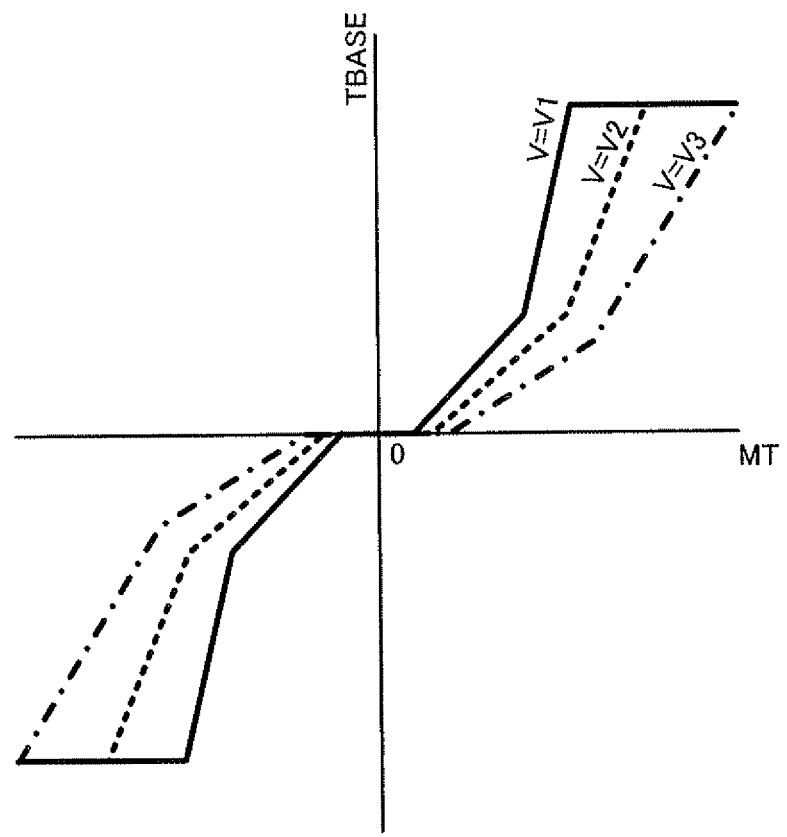
FIG. 6 is a schematic diagram showing a relation between an EPS basic target torque TBASE and a driver steering torque MT in the vehicle in the first embodiment.

Now, with reference to FIG. 6, an explanation will be given on a relation between the EPS basic target torque TBASE and the driver steering torque MT. FIG. 6 is a schematic diagram showing the relation between the EPS basic target torque TBASE and the driver steering torque MT.

In FIG. 6, the vertical axis shows the EPS basic target torque TBASE, and the horizontal axis shows the driver steering torque MT. Incidentally, an area on the left side of an origin line corresponding to the driver steering torque MT=0 corresponds to a steering operation of steering to the left side of the vehicle, and an area on the right side corresponds to a steering operation of steering to the right side of the vehicle. Therefore, the EPS basic target torque TBASE has a symmetrical characteristic to the origin line in FIG. 6.

On the other hand, FIG. 6 illustrates the characteristics of the EPS basic target torque TBASE with respect to the three types of vehicle speeds V which are the vehicle speed V=V1, V2 (V2>V1) and V3 (V3>V2) in a solid line, a dashed line, and an alternate long and short line, respectively. As is clear from FIG. 6, the EPS basic target torque TBASE is set on the reduction side with an increase in the vehicle speed. This is because the rudder angle for obtaining the necessary lateral acceleration reduces with an increase in the vehicle speed. By increasing a force required for the steering of the steering wheel 11 on the high vehicle speed side (i.e. a state in which the steering wheel feels heavy), the driver's excessive operation is prevented, thereby stabilizing the behavior of the vehicle 10. Incidentally, the ROM of the ECU 100 stores therein an EPS basic target torque map which quantifies the relation shown in FIG. 6 in advance (of course, the vehicle speed V as a parameter value is finer), and an appropriate value is selected from the EPS basic target torque map in the step S202.

Back in FIG. 5, the ECU 100 calculates an EPS final target torque TTG in accordance with the following equation (2), on the basis of the EPS basic target torque TBASE calculated in the step S202 and the LKA target assist torque TLK previously calculated and stored (step S203).

$$TTG=TBASE+TLK \quad (2)$$

If calculating the EPS final target torque TTG, the ECU 100 controls the EPS driving apparatus 500 on the basis of the calculated EPS final target torque TTG to output the assist torque TA corresponding to the EPS final target torque TTG from the EPS motor of the EPS actuator 400 (step S204). If the step S204 is performed, the process is returned to the step S101.

As described above, in the embodiment, the EPS actuator 400 functions as a main system for making the vehicle 10 follow the target driving route, and in addition to the normal assist torque corresponding to the driver's steering operation, the LKA target assist torque TLK for making the vehicle 10 follow the target driving route is outputted.

On the other hand, the EPS actuator 400 does not change the relation between the steering angle of the steering wheel 11 and the rudder angle of the steered wheels. Thus, if the following for the target driving route is performed by the application of the assist torque from the EPS actuator 400, the steering wheel 11 is steered in accordance with a change in the rudder angle independently of the driver's will. This makes the driver feel uncomfortable and this can likely induce an unnecessary steering operation on the driver side. Thus, in the embodiment, a change in the behavior when the vehicle 10 is made follow the target driving route by the EPS actuator 400 as described above is compensated (or corrected) by VGRS control.

Figure 7:
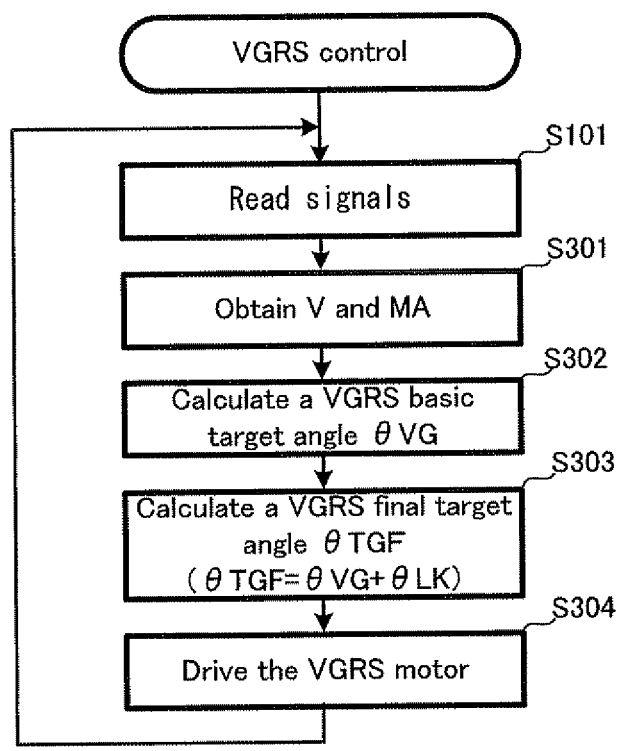
FIG. 7 is a flowchart showing VGRS control in the vehicle in the first embodiment.

Now, with reference to FIG. 7, the details of the VGRS control will be explained. FIG. 7 is a flowchart showing the VGRS control. Incidentally, in FIG. 7, the overlap points with FIG. 2 will carry the same reference numerals, and the explanation thereof will be omitted as occasion demands.

In FIG. 7, after reading the various signals (the step S101), the ECU 100 obtains the vehicle speed V and the steering angle MA (step S301). The ECU 100 also calculates a VGRS basic target angle θVG, which is the basic value of the relative rotation angle of the lower steering shaft 13 with respect to the steering angle MA as the rotation angle of the upper steering shaft 12, in accordance with the following equation (3), on the basis of the obtained vehicle speed V and the obtained steering angle MA (step S302).

$$\theta VG=K1 \times MA \quad (3)$$

In the above equation (3), K1 is the steering transmission ratio for defining the rotation angle of the lower steering shaft 13 with respect to the steering angle MA, and it is a numerical value which can vary depending on the vehicle speed V.

Figure 8:
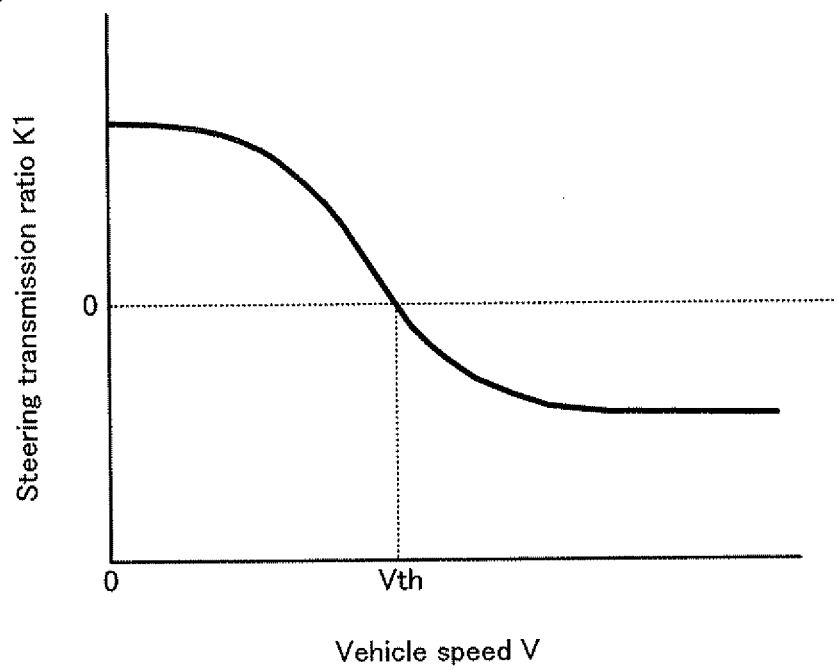
FIG. 8 is a schematic diagram showing a relation between a steering transmission ratio K1 and a vehicle speed V in the vehicle in the first embodiment.

Now, with reference to FIG. 8, an explanation will be given on a relation between the steering transmission ratio K1 and the vehicle speed V. FIG. 8 is a schematic diagram showing the relation between the steering transmission ratio K1 and the vehicle speed V.

In FIG. 8, the steering transmission ratio K1 is 0 at a vehicle speed Vth in a middle vehicle speed area (i.e. the ratio of rotation between the upper steering shaft 12 and the lower steering shaft 13 is 1:1), is greater than 0 on the lower vehicle speed side lower than Vth, and is less than 0 on the higher vehicle speed side. In other words, the larger rudder angle can be obtained by using the smaller steering angle on the lower vehicle speed side. This is because the lateral acceleration with respect to the rudder angle increases with an increase in the vehicle speed, as described above.

Back in FIG. 7, the ECU 100 further calculates a VGRS final target angle θTGF in accordance with the following equation (4), on the basis of the calculated VGRS basic target angle θVG and the LKA correction target angle θLK previously calculated and stored (step S303).

$$\theta TGF=\theta VG+\theta LK \quad (4)$$

If calculating the VGRS final target angle θTGF, the ECU 100 controls the VGRS driving apparatus 300 on the basis of the calculated VGRS final target angle θTGF to rotate the VGRS motor 202 of the VGRS actuator 202 by an amount corresponding to the VGRS final target angle θTGF (step S304). If the step S304 is performed, the process is returned to the step S101.

As described above, according to the VGRS control in the embodiment, the LKA correction target angle θLK is separately added to the target angle of the normal VGRS. Thus, it is possible to suppress a change in the steering angle MA when the vehicle 10 is made follow the target driving route due to the previous EPS control. Thus, the uncomfortable feeling given to the driver is reduced and the driver's psychological burden can be reduced, by which the behavior of the vehicle 10 can be stabilized.

Figure 9:
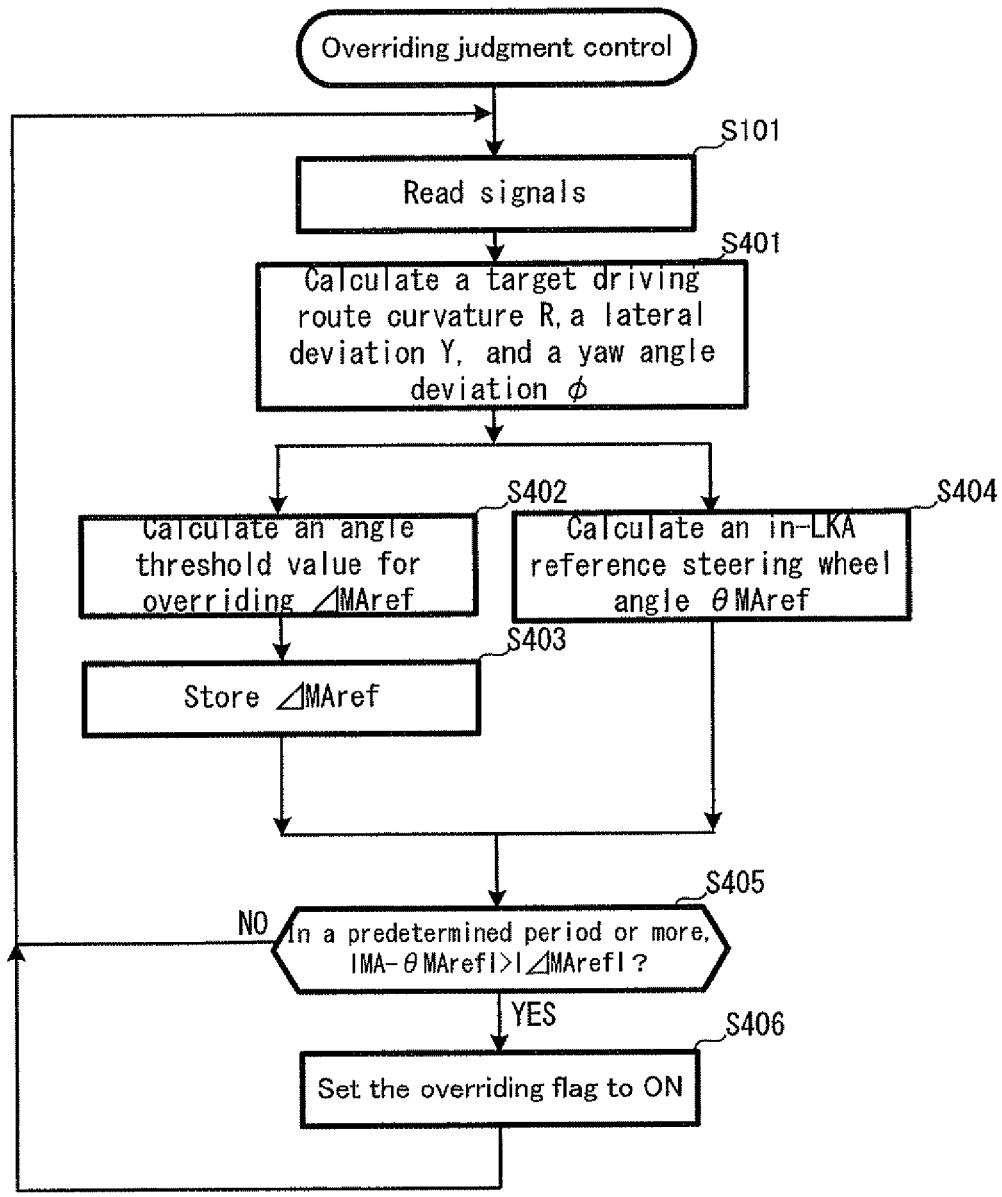
FIG. 9 is a flowchart showing overriding control performed in the vehicle in the first embodiment.

Next, the overriding judgment control in the step S103 (refer to FIG. 2) will be explained in detail with reference to FIG. 9 and FIG. 10. FIG. 9 is a flowchart showing the overriding judgment control in the step S103.

In FIG. 9, after reading the various signals (the step S101), the ECU 100 calculates the curvature R of the target driving route (i.e. inverse of a radius), the lateral deviation Y between the white line and the vehicle 10, and the yaw angle deviation φ between the white line and the vehicle 10. Incidentally, various aspects including a known image recognition algorithm can be applied to an aspect of calculating information required for the control to follow the target driving route of this type and it has a weak correlation with the essential part of the present invention. Thus, the calculation aspect will not be mentioned herein.

If the various road surface information is calculated, the process branches to two systems. In other words, in one process, the ECU 100 calculates an angle threshold value for overriding ΔMAref (step S402) and stores the calculated angle threshold value for overriding ⊿MAref into a proper rewritable storing device, such as a flash memory and a RAM (step S403).

Now, with reference to FIG. 10, an explanation will be given on a relation between the angle threshold value for overriding ⊿MAref and the curvature R of the target driving route. FIG. 10 is a schematic diagram showing the relation between the angle threshold value for overriding ⊿MAref and the curvature R of the target driving route.

Figure 10:
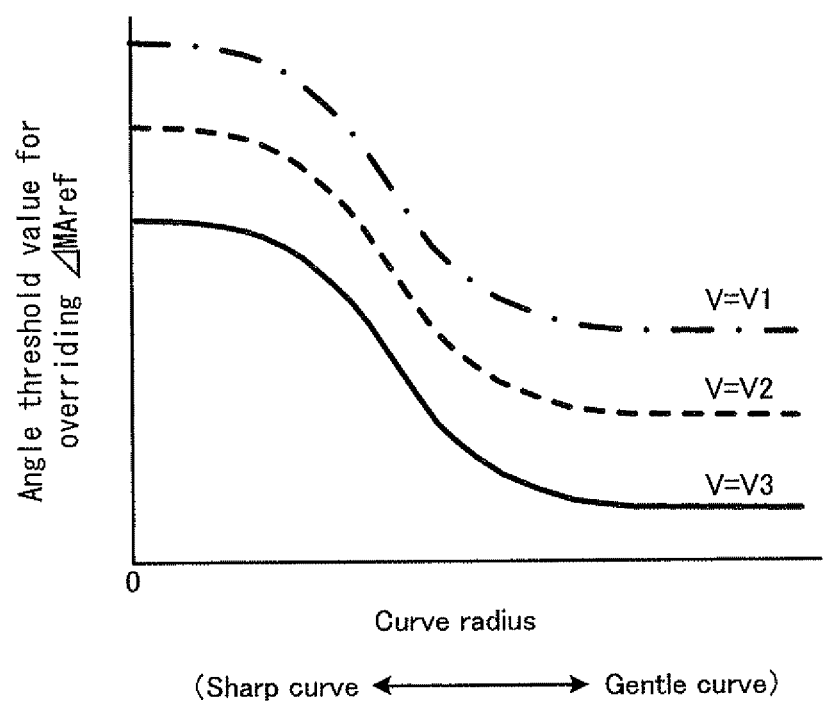
FIG. 10 is a schematic diagram showing a relation between an angle threshold value for overriding θMAref and the curvature R in the vehicle in the first embodiment.

In FIG. 10, the vertical axis shows the angle threshold value for overriding ⊿MAref, and the horizontal axis shows the curvature R of the target driving route. Therefore, the target driving route is suddenly curved (i.e. sharp curve) with movement to the left side in FIG. 10. As shown in FIG. 10, the angle threshold value for overriding ⊿MAref is set to be larger with a decrease in the curve radius (i.e. with a shaper curve). This is because the steering of the steering wheel 11 is allowed (an uncomfortable feeling is not generated from the driver's viewpoint) with an increase in the curvature.

Moreover, FIG. 10 illustrates the characteristics of the angle threshold value for overriding ⊿MAref with respect to three types of vehicle speeds V which are the vehicle speed V=V1, V2 (V2>V1) and V3 (V3>V2) in an alternate long and short line, a dashed line, and a solid line, respectively. As is clear from FIG. 10, the angle threshold value for overriding ⊿MAref is set on the reduction side with an increase in the vehicle speed. This is because the degree of the lateral acceleration generated with respect to the rudder angle increases with an increase in the vehicle speed.

Incidentally, the ROM of the ECU 100 stores therein an angle threshold value map for overriding which quantifies the relation shown in FIG. 10 in advance, and an appropriate value is selected from the angle threshold value map for overriding in the step S402.

Back in FIG. 9, in the other process, the ECU 100 calculates a reference steering-wheel angle during LKA θMAref in accordance with the following equation (5) on the basis of the LKA correction target angle θLK and the VGRS final target angle θTGF (step S404). Incidentally, the reference steering-wheel angle during LKA θMAref is one example of the "reference steering angle" of the present invention.

$$\theta MAref = \theta LK - \theta TGF \quad (5)$$

In each of the branched steps described above, after the calculation of the angle threshold value for overriding ⊿MAref and the reference steering-wheel angle during LKA θMAref, the absolute value of the deviation between the steering angle MA and the reference steering-wheel angle during LKA θMAref is compared with the absolute value of the angle threshold value for overriding ⊿MAref in a step S405 (step S405). At this time, the ECU 100, which performs the step S405, functions as the "judging device" of the present invention and performs the overriding judgment.

The result of the overriding judgment is stored, as described above, as ON/OFF of the overriding flag in a predetermined memory area on the RAM as one portion of the ECU 100. The overriding flag is set to OFF in the initial state, and if the overriding judgment is performed, the ECU 100 sets the overriding flag to ON.

If the deviation between the steering angle MA and the reference steering-wheel angle during LKA θMAref is greater than the angle threshold value for overriding ⊿MAref (the step S405: YES), the ECU 100 performs the overriding judgment and sets the overriding flag to ON (step S406).

On the other hand, if the deviation between the steering angle MA and the reference steering-wheel angle during LKA θMAref is less than or equal to the angle threshold value for overriding ⊿MAref (the step S405: NO), the overriding flag is kept OFF.

The overriding flag set by the overriding judgment control in this manner is stored on the RAM as one portion of the ECU 100 as described above, and it is referred to by the CPU, by which the LKA control can be stopped as occasion demands.

According to the overriding judgment control described above, in performing the LKA driving, if the driving route is changed by the driver's will and if the steering operation is requested in order to avoid an obstacle on the road, the lane keeping driving can be stopped in proper timing, and more faithful driving for the steering operation based on the driver's will can be performed. In particular, at the time of LKA driving in the embodiment, the LKA correction target angle θLK is separately added to the target angle of the normal VGRS due to the VGRS control. Thus, it is possible to suppress the change in the steering angle MA when the vehicle 10 is made follow the target driving route due to the previous EPS control. Moreover, the uncomfortable feeling given to the driver is reduced and the driver's psychological burden can be reduced, by which the behavior of the vehicle 10 can be stabilized. On the other hand, by appropriately performing the overriding judgment, the lane keeping driving can be stopped in proper timing, and more faithful driving for the steering operation based on the driver's will can be performed when the steering operation is requested by the driver.

Second Embodiment

Next, a second embodiment will be explained. In the second embodiment, in performing the overriding judgment, as opposed to the aforementioned first embodiment, it is judged by the judging device whether or not the overriding takes place, on the basis of the specified steering torque and threshold value.

Incidentally, the second embodiment is the same as the first embodiment except in the overriding judgment control; namely, the second embodiment is the same as the first embodiment in the EPS control, the VGRS control and the like. Therefore, here, an explanation will be given on the overriding judgment control which is different from that in the first embodiment, and an explanation will be omitted on the other controls which are the same as those in the first embodiment.

Figure 11:
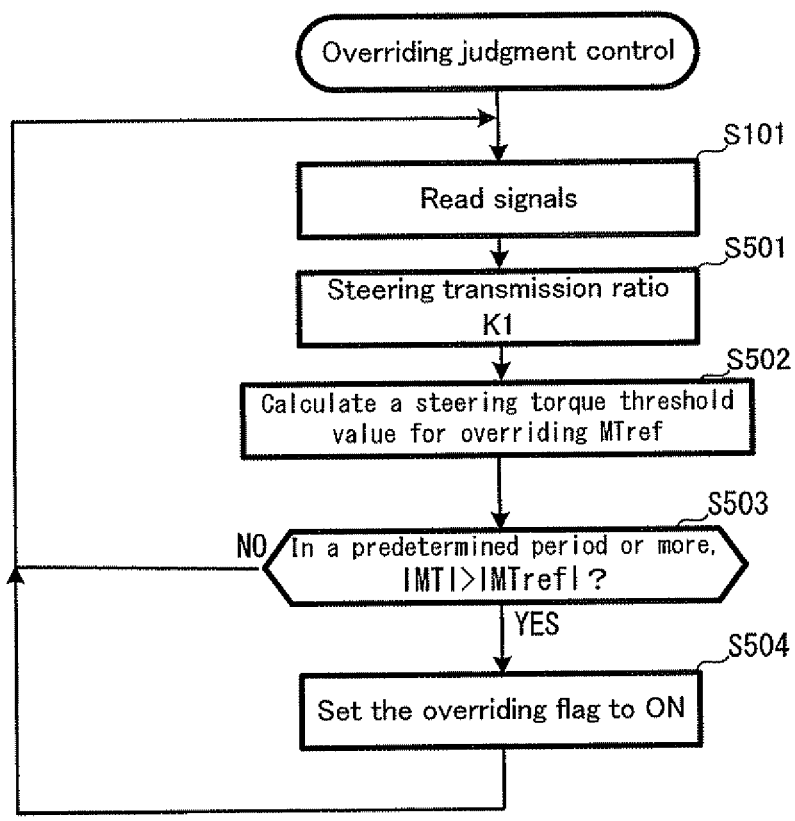
FIG. 11 is a flowchart showing overriding judgment control in a second embodiment.
Figure 12:
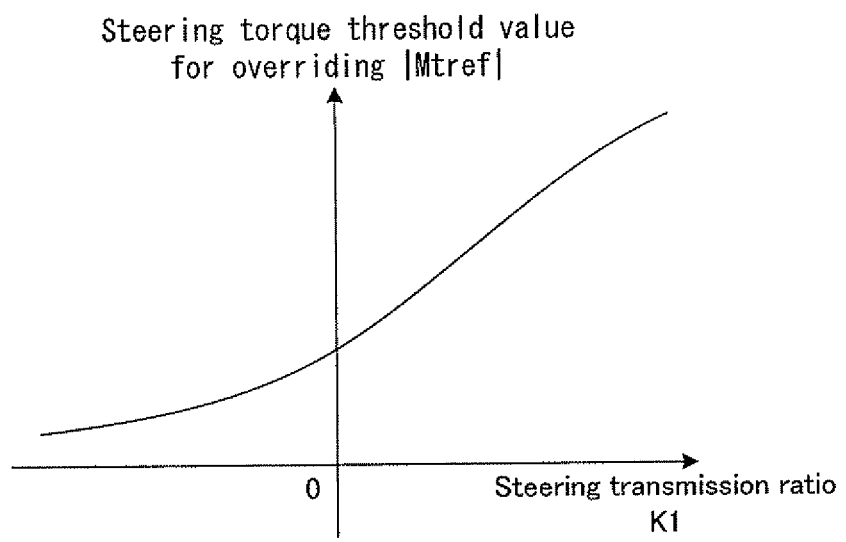
FIG. 12 is a schematic diagram showing a relation between a steering torque threshold value for overriding |MTref| and the steering transmission ratio K1 in second embodiment.

With reference to FIG. 11 and FIG. 12, an explanation will be given on the overriding judgment control in the second embodiment. FIG. 11 is a flowchart showing the overriding judgment control in the second embodiment. Moreover, the vehicle structure in the second embodiment is assumed not to be different from that of the vehicle 10 in the first embodiment.

In FIG. 11, the ECU 100 reads the various singles (the step S101). After that, the ECU 100 reads the steering transmission ratio K1 calculated in the step S302 in the VGRS control (step S501) and obtains a corresponding steering torque threshold value for overriding |MTref| (step S502).

Now, with reference to FIG. 12, an explanation will be given on a relation between the steering torque threshold value for overriding |MTref| and the steering transmission ratio K1. FIG. 12 is a schematic diagram showing the relation between the steering torque threshold value for overriding |MTref| and the steering transmission ratio K1.

In FIG. 12, the steering torque threshold value for overriding |MTref| proportionally increases with an increase in the steering transmission ratio K1. In other words, a threshold value for judging the overriding is made variable depending on the steering transmission ratio K1 for defining a relative relation between the steering angle and the rudder angle. Thus, if the value of the steering transmission ratio K1 is small, which means the change in the rudder angle with respect to the steering angle is relatively small, the steering torque threshold value for overriding |MTref| which is the threshold value for judging the overriding is set to be relatively small. On the other hand, if the value of the steering transmission ratio K1 is large, which means the change in the rudder angle with respect to the steering angle is relatively large, the steering torque threshold value for overriding |MTref| is set to be relatively large.

Then, out of the signals read in the step S101, the absolute value of the steering torque MT|MT| is compared with the steering torque threshold value for overriding |MTref| calculated in the step S502 (step S503). At this time, the ECU 100, which performs the step S503, functions as the "judging device" of the present invention and performs the overriding judgment.

The result of the overriding judgment is stored, as described above, as ON/OFF of the overriding flag in a predetermined memory area on the RAM as one portion of the ECU 100. The overriding flag is set to OFF in the initial state, and if the overriding judgment is performed, the ECU 100 sets the overriding flag to ON.

If the absolute value of the steering torque MT|MT| is greater than the steering torque threshold value for overriding |MTref| (the step S503: YES), the ECU 100 performs the overriding judgment and sets the overriding flag to ON (step S504).

On the other hand, if the absolute value of the steering torque MT|MT| is less than or equal to the steering torque threshold value for overriding |MTref| (the step S503: NO), the overriding flag is kept OFF (step S504).

The overriding flag set by the overriding judgment control in this manner is stored on the RAM as one portion of the ECU 100 as described above, and it is referred to by the CPU, by which the LKA control can be stopped as occasion demands.

As described above, even if the overriding judgment is performed by using the steering torque, the threshold value for judging the overriding is made variable depending on the steering transmission ratio K1 for defining the relative relation between the steering angle and the rudder angle. By this, it is possible to always maintain the steering feeling on the driver's side when the overriding is detected, at a certain level. In other words, in making the vehicle follow the target driving route, it is possible to detect the overriding performed by the driver, quickly and accurately.

The present invention is not limited to the aforementioned embodiments, but various changes may be made, if desired, without departing from the essence or spirit of the invention which can be read from the claims and the entire specification. A steering support apparatus of a vehicle, which involves such changes, is also intended to be within the technical scope of the present invention.

INDUSTRIAL APPLICABILITY

The present invention can be used to, for example, a steering support apparatus of a vehicle for making a vehicle follow a target driving route.

DESCRIPTION OF REFERENCE CODES

FL, FR wheels
10 vehicle
11 steering wheel
12 upper steering shaft
13 rear steering shaft
14 pinion gear
16 steering torque sensor
17 steering angle sensor
18 rotation angle sensor
100 ECU
200 VGR actuator
300 VGRS driving apparatus
400 EPS actuator
500 EPS driving apparatus

The invention claimed is:

1. A driving support apparatus of a vehicle for supporting driving of the vehicle, the vehicle comprising a rudder angle varying device capable of changing a relative relation between a steering angle as a rotation angle of a steering input shaft and a rudder angle as a rotation angle of steered wheels,
said driving support apparatus comprising:
a following control device for controlling the rudder angle varying device such that the vehicle follows a target driving route;
a steering torque specifying device for specifying a steering torque applied to the steering input shaft;
a judging device for judging whether or not overriding performed by a driver takes place on the basis of the specified steering torque and a predetermined threshold value; and
a threshold value setting device for setting the threshold value in accordance with the relative relation between the steering angle and the rudder angle,
said following control device stopping the vehicle following for the target driving route if it is judged that the overriding takes place.

2. The driving support apparatus of the vehicle according to claim 1, wherein
the rudder angle varying device changes the relative relation by relatively rotating a steering output shaft coupled with the steered wheels with respect to the steering input shaft, and
said following control device controls the rudder angle varying device at the time of following for the target driving route such that a steering transmission ratio as the relative relation, which defines a rotation angle of the steering output shaft with respect to the steering angle, is reduced in comparison with at the time of non-following for the target driving route.

* * * * *